Patented July 1, 1930

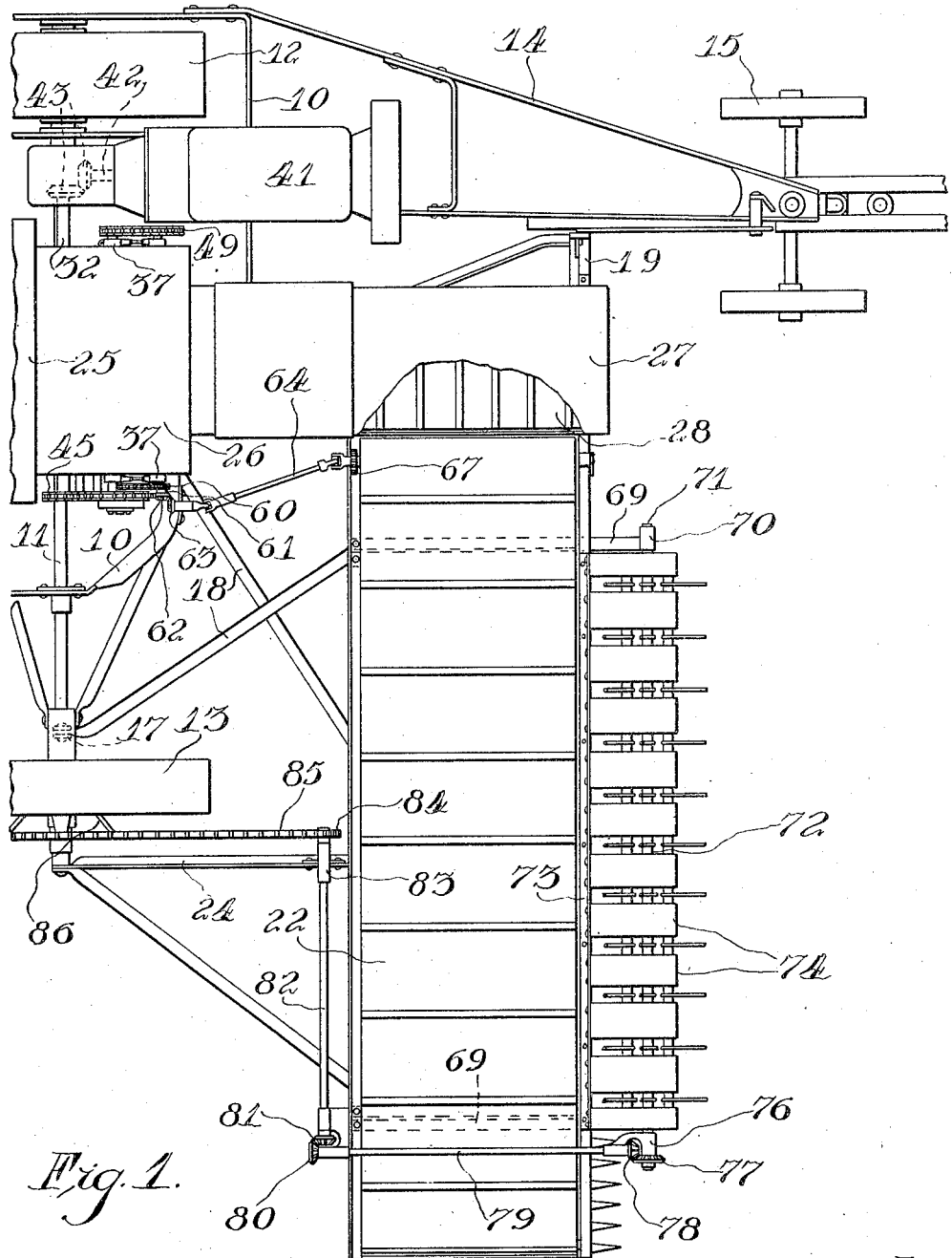

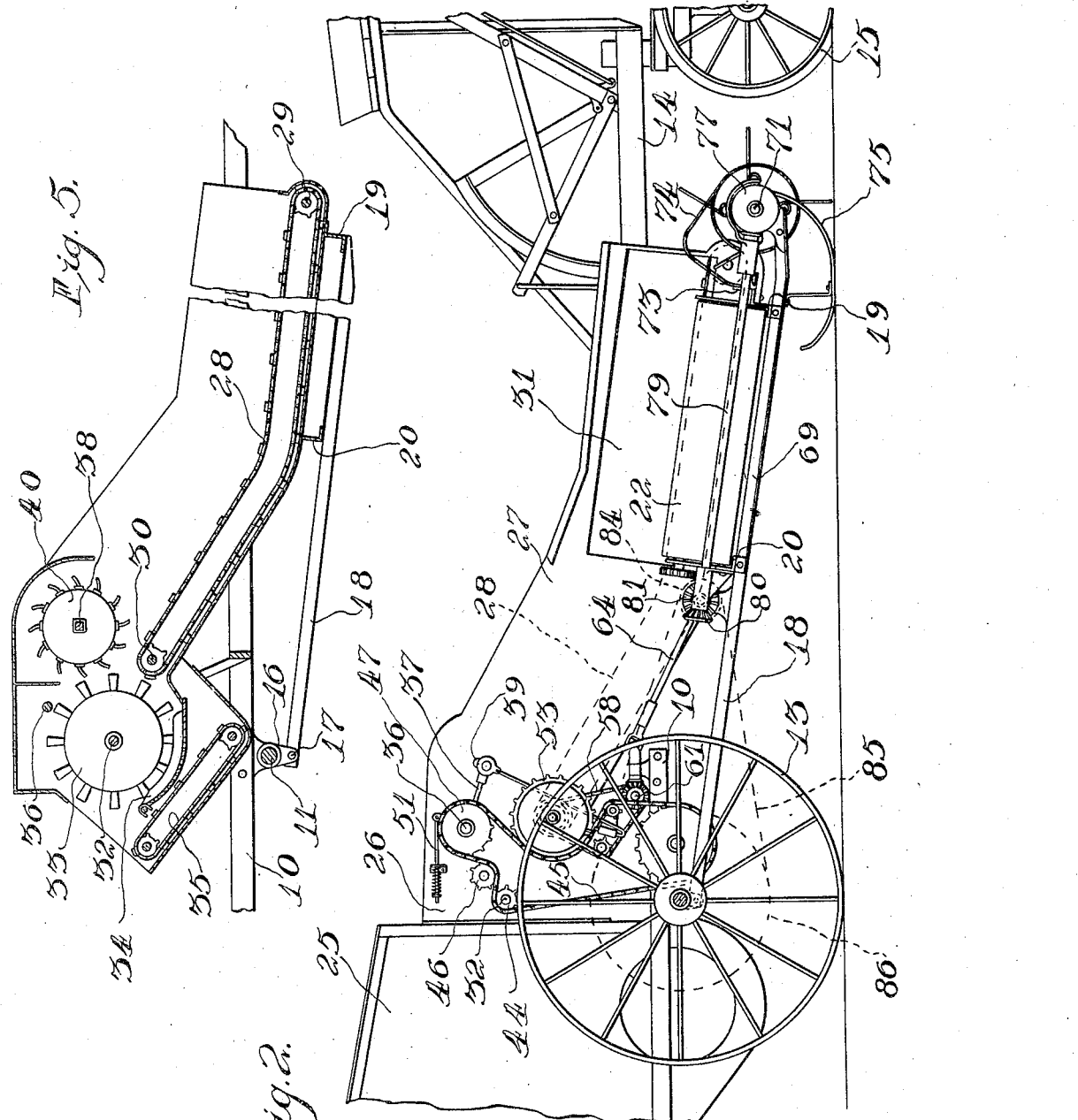

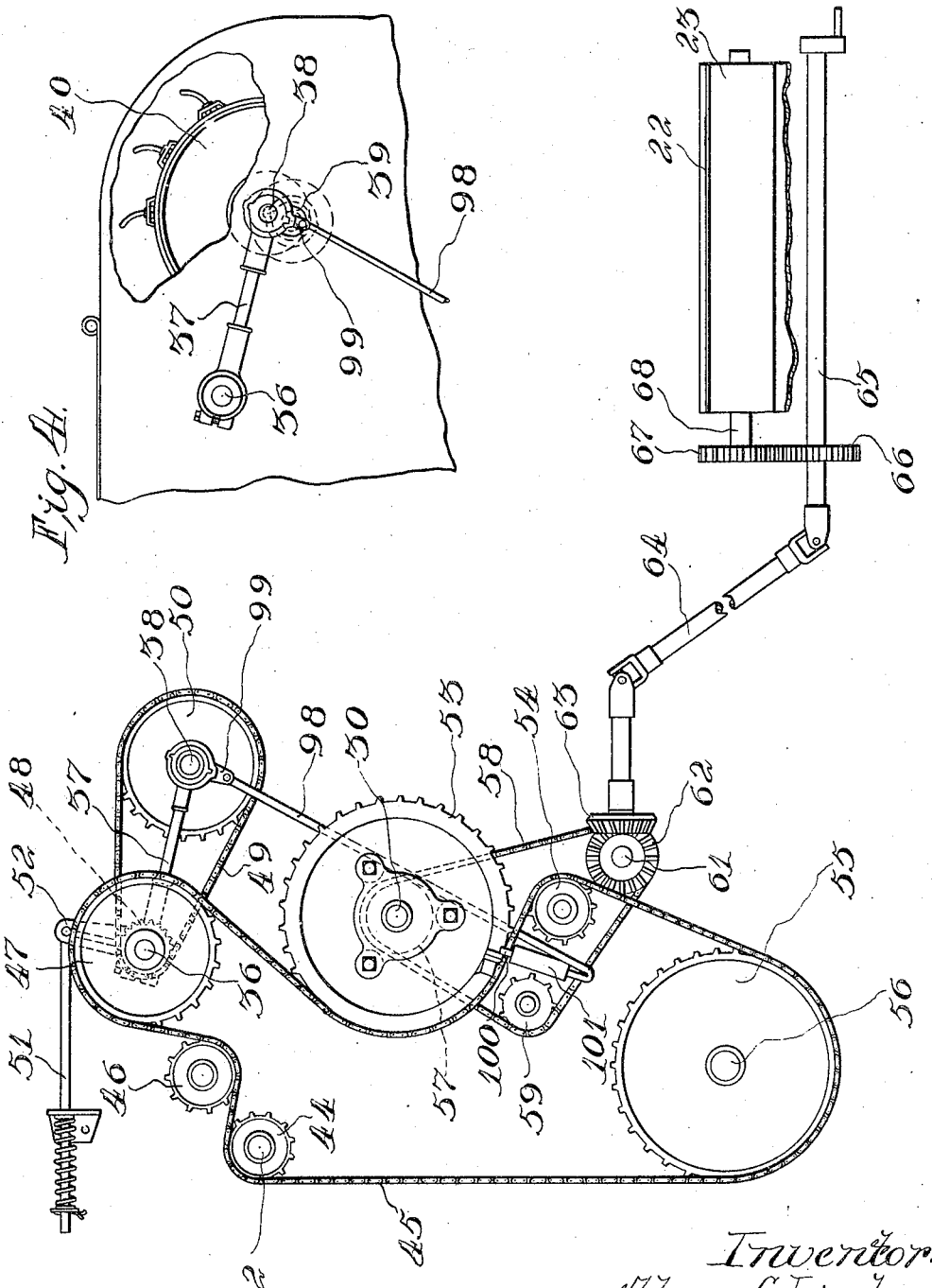

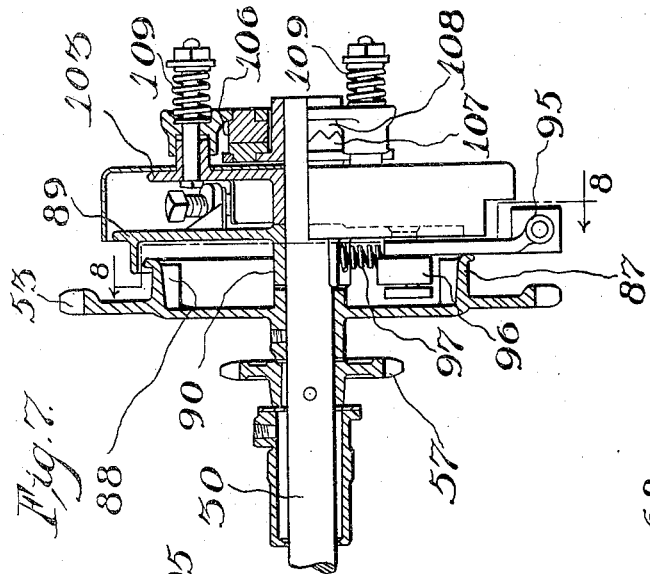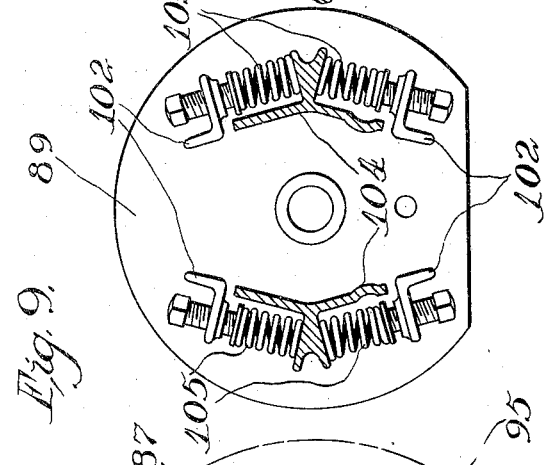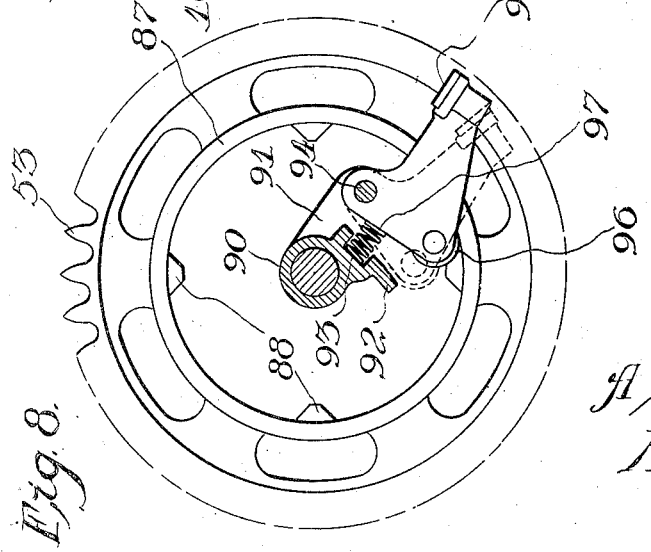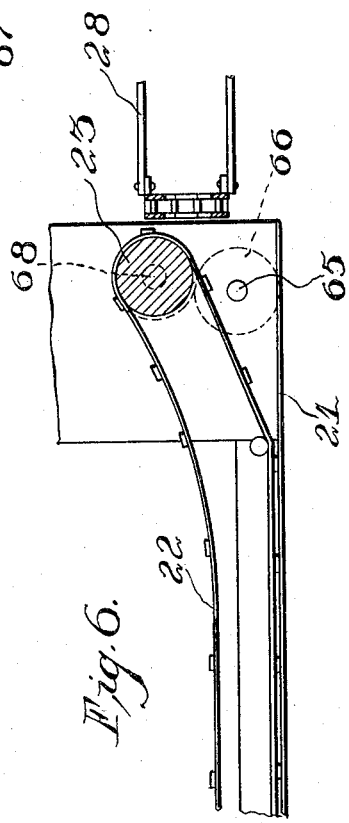

1,769,031

UNITED STATES PATENT OFFICE

ALEXUS C. LINDGREN, OF CHICAGO, ILLINOIS, ASSIGNOR TO INTERNATIONAL HARVESTER COMPANY, A CORPORATION OF NEW JERSEY

HARVESTER THRASHER

Application filed September 24, 1927. Serial No. 221,645.

This invention relates to harvester thrashers.

These machines as now known comprise a wheel carried, transverse axle supporting a frame on which is located, at the grainward side, a cutting and gathering platform, including a laterally moving conveyer. The opposite side of the frame, that is, the stubbleward side, carries a longitudinally arranged thrasher part, forwardly of which is a feeder housing in which is a conveyer leading to the thrasher part and communicating at its front end with the platform conveyer already mentioned. These machines cut, gather and thrash the grain in a single passage through the field, the prerequisite condition to their use, if efficient thrashing is to be accomplished, being that the grain cure, or dry out, properly on the standing stalks. Necessarily then, these machines are limited in their use to such geographical localities which are satisfactorily non-humid in their climates to create the ideal harvester thrasher conditions. The use of these machines entails great savings in cost, time and labor, and prevents much grain wastage, and it necessarily follows that farmers in humid geographical regions, where grain will not ripen on the standing stalk, are at a decided disadvantage in the matter of production costs, as they must rely upon the relatively costly, old established machines and methods. It thus follows that it would be of benefit to farmers of the humid regions if they could employ harvester thrashers in their harvest operations. And so it follows that implement manufacturers have been confronted with the problem of adapting harvester thrashers to the humid regions, and making them usable.

The situation is being met by a first harvest operation of cutting a wide swath of grain and laying it out in windrows on the grain stubble, thus permitting wind and sun to ventilate and cure the grain in this manner. The swathing can be accomplished by converting old grain binders or by employing special swathers to do this work of forming a windrow. The grain under ordinary circumstances should cure satisfactorily in the windrow and be ready for thrashing in two or three days. After the windrow has cured, it only remains to adapt the harvester thrasher for picking up the windrow and then feeding it along the platform conveyer to the feeder for the thrasher part. Thus, a pick-up device is substituted for the usual platform cutting mechanism. In the form herein to be shown, this pick-up device will be a platform attachment for gathering and loading the cured windrow onto the platform conveyer.

As grain seldom grows evenly and with uniform thickness in a field, it naturally follows that bunching occurs in the windrow, which bunches will be loaded onto the platform conveyer by the pick-up attachment, and these bunches will be fed intact to the thrashing cylinder, thereby unduly taxing the capacity of said thrashing cylinder and resulting in inefficient separation of the grain from the straw. It is desirable, therefore, that means be provided for regulating the feed of grain to the thrashing cylinder, so that the feed will be even and uniform.

With this problem presented, the present invention specifically relates to a volume control for the feed in a harvester thrasher employing a windrow pick-up device, and to provide this control is the primary object of the invention.

Another object is to provide a combination feed and control element in the feeder housing which will automatically adjust itself with respect to the moving mass of grain, and which, when undesirable bunching occurs, will automatically stop the platform and feeder conveyers and thin out the bunched mass of grain and then once more automatically start the said conveyers again.

Other objects will be apparent to those skilled in this art as the description progresses.

Briefly, these desirable objects are accomplished in a harvester thrasher, in which a pick-up device has been substituted for the usual cutting mechanism, said harvester thrasher having a spiked rotatable drum element above the feed conveyer in the feeder housing. Such drum or cylinder will be carried for floating movement up and down, so that when an abnormal mass of grain, such as a bunch, is about to pass to the thrashing cylinder, the drum will float or rise up and, if it reaches a predetermined point, it will, through suitable connections, stop a driving clutch part and thereby stop, automatically, the movement of both the platform and feeder conveyers. Thus, the further feed of grain will be stopped until the thrashing cylinder has disposed of the abnormal bunch or volume, when the drum element will once more drop to its normal position and again connect the drive clutch element, whereupon the said conveyers will be started again to continue the feed. Thus, the volume of feed is automatically regulated without stopping the continued forward travel of the harvester thrasher, as will more fully appear.

Looking now to the accompanying sheets of drawings wherein is illustrated one form which this invention may assume in practice:

Figure 1 is a general plan view of a harvester thrasher having a windrow pick-up device attached to the gathering platform;

Figure 2 is a general side view looking from the grainward side of the machine, showing the same organization as appears in Figure 1;

Figure 3 is a schematic view of the drive layout for the volume control feature;

Figure 4 is a side elevational detail view showing the spiked beater and its floating mounting;

Figure 5 is a detail, side sectional view, vertically and centrally, along a longitudinal line, through the feeder housing, showing the organization of feeder elements for the thrashing cylinder;

Figure 6 is a detail front elevational view showing how the platform conveyer communicates with the feeder conveyer;

Figure 7 is a sectional view through the clutch assembly;

Figure 8 is a face view, partly in section, of the clutch parts, as seen along the section line 8—8 of Figure 7, when looking in the direction of the arrows; and Figure 9 is a face view, partly in section, of a clutch detail.

Looking now to the drawings, it will be seen that a standard harvester thrasher has been shown for the purpose of illustrating the invention, said harvester thrasher including a main frame 10 carried rigidly on a transversely extending axle 11, mounted in a main carrying wheel 12 and a grain wheel 13. The main frame includes a longitudinally and forwardly extending A-frame part 14, the front end of which is supported on a steering wheel truck 15.

The axle, at its grainward side, carries depending brackets 16 (only one being shown) to which are pivotally connected as at 17, crossed, forwardly extending frame bars 18, which carry at their front ends, the usual transverse Z-bar 19, and rearwardly thereof, the angle bar 20. These bars 19 and 20 carry the transverse, cutting and gathering platform 21 including a transverse conveyer 22 carried around the usual roller 23 at its stubbleward end, (see Figure 6). This platform described is additionally supported by a bar 24 pivoted to the axle 11 outwardly of the grain wheel 13, as best shown in Figure 1.

The stubbleward side of the main frame 10 carries a thrasher part including a main thrasher housing 25, a cylinder housing 26 in front thereof, and forwardly of the cylinder housing, a longitudinally extending feeder housing 27. The forward end of the feeder housing rests on the Z-bar 19. In this feeder housing is a rearwardly and upwardly inclined feed conveyer 28, the front end of which operates in any approved manner around an idler shaft 29, while its rear upper end is trained around a drive shaft 30 journaled in the cylinder housing 26. The grainward side of the feeder housing is open at 31 adjacent the platform 21, so that the platform conveyer can feed directly onto the feeder conveyer 28, as best seen in Figures 1, 2 and 6.

In the housing 26 is journaled a transverse cylinder shaft 32 which carries the thrashing cylinder 33, as best shown in Figure 5. Beneath the thrashing cylinder is a concave 34 and a conveyer 35 for conveying the initially thrashed material back into the main thrashing housing 25 for further cleaning. Above the cylinder shaft is a transverse jack shaft 36 which at its ends, outside the housing 26, carries a pair of pivotally mounted arms 37 which extend forwardly, and floatingly support a shaft 38 in suitable wall slots 39. This shaft 38 carries a rotatable spiked beater drum or cylinder 40 located in advance of the thrashing cylinder and normally slightly above the discharge end of the feeder conveyer 28. The drive for the thrashing cylinder, feeder parts, and platform conveyer will next be described.

See Figures 1, 2 and 3. On the main frame 10 at its stubbleward side, is mounted an engine 41 having its shaft 42 geared by bevel gears 43 to the cylinder shaft 32. On the grainward side of the cylinder housing, the cylinder shaft carries a sprocket wheel 44 on which is trained a drive chain 45 passing under an idler sprocket wheel 46 and over a larger sprocket wheel 47 on the jack shaft 36. The stubbleward end of the jack shaft 36 carries a small sprocket wheel 48 connected by a chain 49 to a large sprocket wheel 50 on the stubbleward end of the beater shaft 38 for driving the beater in a counter-clockwise direction, and at a relatively slow speed, as seen in Figure 5. Thus, the floating, spiked beater 40 is driven. Means in the form of a spring pressed rod 51 acting through a crank 52 on the shaft 36 tends normally to press the beater 40 to its lowermost position.

Going back now to the grainward side of the machine again, it will be seen that the driving chain 45 next runs around a large sprocket wheel 53 loosely mounted on the feeder conveyer shaft 30. (See also Figures 7 and 8.) The chain 45 then completes its circle by going around a small idler sprocket wheel 54 and a large sprocket wheel 55 on a shaft 56. The shaft 56 drives in any approved manner, not shown, the shaker screening mechanism in the body of the thrasher 25, also not shown. Just inside of the sprocket wheel 53 is a small sprocket wheel 57 fast on the shaft 30, which drives a chain 58 trained around a small idler sprocket wheel 59 and a sprocket wheel 60 on a stub shaft 61 journaled suitably on the main frame 10. The stub shaft 61 also carries a bevel gear 62 in mesh with a bevel pinion 63 on a flexible shaft 64 connected to drive a shaft 65. The shaft 65 is the usual shaft which drives a pitman 66 for the cutting knives of the platform when the harvester thrasher is used for cutting the grain. Here, however, the cutting mechanism has been removed and the shaft 65 merely serves, through a gear 66, to drive a gear 67 on a shaft 68 carrying the roller 23 heretofore described. Thus, the platform conveyer 22 is driven to move material or grain thereon into the feeder housing and onto the feeder conveyer 28 therein. It will now be clear how the thrashing cylinder 33, the beater 40, the feed conveyer 28, and the platform conveyer 22 are driven from the engine 41. The platform, windrow pick-up and loading attachment will next be described, and in this connection reference is to be made to Figures 1 and 2.

Underneath the platform, the angle bar 20 and Z-bar 19 carry a pair of spaced, forwardly extending bars 69, which extend a distance forwardly of the platform. Each of these bars carries at its front end, a bracket 70 in which is rotatably journaled a transverse shaft 71 on which is mounted a tine, a pick-up drum or cylinder 72. A bar 73 is carried on the Z-bar 19 and connected to the bar 73 are shields 74 which surround the pick-up drum in a manner leaving clearance spaces for the teeth of the pick-up drum. The pick-up is carried on shoes 75 connected to the underside of the Z-bar 19. The shaft of the pick-up drum, at its grainward end, carries a bracket 76 and a bevel pinion 77 geared to a bevel gear 78 on a longitudinal shaft 79 supported in any approved manner above the platform. The rear end of this shaft 79 is provided with a bevel pinion 80 geared to a gear 81 on a transverse line shaft 82 journaled in a bracket 83 carried by the arm 24 just in back of the platform. The shaft 82 carries a sprocket wheel 84 connected by a chain 85 to a large sprocket wheel 86 securely carried on, or formed as a part of, the grain wheel 13. Thus, it will be seen that the drum of the pick-up, platform attachment will be driven from the grain wheel 13 independently of the drive for the conveyers on the platform and in the feeder housing.

It will be understood now that the pick-up drum 72 picks up the windrow and loads it onto the platform conveyer 22, which moves the grain onto the feeder conveyer 28, whence the grain goes up the incline to the thrashing cylinder 33 with the aid of the spiked beater 40. For the sake of efficient, initial thrashing at the thrashing cylinder 33, it is highly important that the grain being fed thereto be always in a steady, uniform flow and in substantially unvarying volume. But a real problem is encountered in this respect, because bunching of the material occurs in the windrow. Means has, therefore, been provided in the form of an automatic volume control for regulating the flow of the material, by stopping the platform and feeder conveyers when bunching occurs at the beater 40, thus giving said beater a chance to dispose of the bunch, and, when this has taken place, the volume control means automatically acts to start the conveyers again. This means will now be described, especial reference being made to Figures 7, 8 and 9.

It will be remembered that the feeder conveyer drive shaft 30 carries a loose sprocket wheel 53 which rotates constantly to keep the shaft 56 turning at all times when the harvester thrasher is running. The sprocket wheel 53 has an integral annular flange 87 provided at its inner periphery with spaced stops 88. Adjacent this sprocket wheel 53, the shaft 30 carries fast thereon, a disk 89 formed with a hub part 90 having an integral, triangular extension 91 and stop 92 with a socket 93 intermediate the extension and stop. The extension carries a pin 94 on which is pivotally mounted a triangular pawl 95 carrying on its remaining angle, a roller 96 adapted normally to seat against one of the stops 88, so that the sprocket wheel 53 and disk 89 normally turn together. A spring 97 in the socket 93 bears against the pawl to hold it in this normal position seated against a stop 88, as best shown in Figure 8.

As has been described, the beater 40 may rise in the feeder housing when an abnormal mass of material passes to the thrashing cylinder. When this occurs, a latch arm 130

98 pivotally connected to a bracket 99 on the beater shaft 38 is pulled up with the beater. The arm includes a reversely bent part 100 slidable in a guide 101 mounted on the grainward side of the feeder housing in such a manner that the part 100 is brought into the path of the pawl 95 to hold said dog, whereupon the pawl pivots back against the spring 97 to release the roller 96 from the stops 88, to stop the disk 89 and shaft 30 from further rotation. As the sprocket wheel 57 is fast on this shaft, it too will stop, and consequently the feeder conveyer 28 and platform conveyer 22 will also stop. Therefore, any material on these conveyers will not be fed along, thereby giving the beater 40, which continues to rotate from power derived from the constantly turning shaft 36, a chance to clear away the abnormal mass of material. The harvester thrasher, of course, will continue along with the pick-up drum 72, driven from the grain wheel 13, continuing to pick up the windrow and loading it onto the platform conveyer 22 now idle. Of course, the conveyers 22 and 28 are idle but a moment, as the beater 40 rapidly clears away the material. With the material cleared away from the drum 40, the drum falls to its normal position, by gravity, and with it, the latch arm 98, thereby freeing the pawl 95, whereupon the spring 97 causes the said pawl to seat against one of the stops 88 to cause the sprocket wheel 53 and disk 89 once more to turn together to drive the platform and feeder conveyers again. And so on, the volume of material fed to the thrashing cylinder is automatically regulated, by means of the intermittent driving connection described.

This sudden stopping and starting of the shaft 30 creates rebound shocks, which it is advisable to take up by some form of shock absorption means. Accordingly, the outer face of the disk 89 carries brackets 102, and a disk 103 carries opposed brackets 104. Between these brackets are fitted springs 105 so arranged that each diagonally opposed pair of springs comes into play when either stopping or starting the shaft to absorb either the inertia of rest or the inertia of momentum, as the case may be.

A conventional form of slip clutch 106 is also provided for the shaft 30, said clutch comprising the opposed interlocked parts 107 and 108, normally pressed together for driving by springs 109. Should the load on the shaft reach a predetermined maximum, the parts 107 and 108 spread apart and permit slippage between the driving clutch and said shaft 30, to prevent injury to any parts.

The operation of the complete organization will now be summarized. It will be remembered that the grain has been previously cut and formed into windrows for curing. The harvester thrasher has been altered to the extent of removing the cutting mechanism and usual reel. A pick-up device has been substituted for the cutting mechanism, said pick-up platform attachment being driven from the ground wheel of the harvester thrasher. The machine is propelled along the field so that the pick-up device may gather and load the windrow onto the platform conveyer. The platform conveyer advances the grain to the feeder conveyer and the latter moves the grain, with the assistance of the spiked beater 40, to the thrashing cylinder 33 for thrashing. This beater 40, in response to bunches or abnormal volumes of grain, floats upwardly, which action controls the operation of both the feeder and platform conveyers by stopping the driving connections therefor, until such time as the bunch has been disposed of by the beater, which is a constantly operating member. Then, automatically, the conveyers start again, when the beater falls to its normal position in the feeder housing. The pick-up drum 72, as it is driven from the grain wheel, operates continuously to load the windrow onto the platform conveyer, even while the conveyers have been momentarily stopped.

It can now be appreciated that a simple, practical structure has been provided for the purposes stated, which achieves all of the desirable objects heretofore recited.

It is the intention to cover all such changes and modifications of the illustrated form of the invention herein shown as do not materially depart from the spirit and scope of the invention as indicated in the appended claims.

What is claimed is:

1. In a harvester thrasher, a thrashing cylinder, feeding means therefor, means connected to the harvester thrasher and traveling over the ground for picking up cut grain lying on the ground and loading it onto said feeding means, and means for controlling the operation of said feeding means automatically by the volume of grain fed to the thrashing cylinder.

2. In a harvester thrasher, a thrashing cylinder, feeding means therefor, means connected to the harvester thrasher and traveling over the ground for picking up a windrow lying on the ground and loading it onto said feeding means, and means adjacent the thrashing cylinder adapted to be acted on by the mass of material handled to control automatically the action of the feeding means for the purpose of regulating the feed.

3. In a harvester thrasher, a thrashing cylinder, feeding means therefor, means connected to the harvester thrasher and traveling over the ground for picking up a windrow lying on the ground and loading it onto said feeding means, and means floatingly mounted in the feed line adapted to be acted on by the mass of material handled to control automatically the action of the feeding means for the purpose of regulating the feed.

4. In a harvester thrasher, a thrashing cylinder, a feeder including a conveyer, a gathering platform including a conveyer, and means in the feeder controlled by the volume of the material for automatically controlling the operation of the platform conveyer.

5. In a harvester thrasher, a thrashing cylinder, a feeder including a conveyer, a platform including a conveyer, a pick-up attachment for the platform, and means in the feeder for automatically controlling the operation of the conveyers to regulate the feed to the thrashing cylinder.

6. In a harvester thrasher, a thrashing cylinder, a feeder conveyer therefor, a gathering platform including a conveyer, and means controlled by the volume of grain fed to the thrashing cylinder for automatically stopping and starting the conveyers to regulate the flow of grain to the thrashing cylinder.

7. In a harvester thrasher, a thrashing cylinder, a feeder conveyer therefor, a gathering platform including a conveyer, a rotatable beater cooperating with the feeder conveyer, and means controlled by said beater for stopping and starting the conveyers to regulate the flow of grain to the thrashing cylinder.

8. In a harvester thrasher, a thrashing cylinder, a feeder conveyer therefor, a gathering platform including a conveyer, a floatingly mounted rotatable beater cooperating with the feeder conveyer, and means controlled by said beater for stopping and starting the conveyers to regulate the flow of grain to the thrashing cylinder.

9. In a harvester thrasher, a thrashing cylinder, a feeder conveyer therefor, a gathering platform including a conveyer, a spiked beater cooperating with the feeder conveyer, and means controlled by said beater for causing the conveyers to stop and start to regulate the flow of grain to the thrashing cylinder.

10. In a harvester thrasher, a thrashing cylinder, a feeder conveyer therefor, a platform including a platform conveyer, means attached to the platform for picking up a windrow and loading it onto the platform conveyer, means for driving the conveyers, independent means for driving the pick-up attachment, and means cooperating with the feeder for stopping and starting the conveyers to regulate the flow of material to the thrashing cylinder.

11. In a harvester thrasher, a thrashing cylinder, a feeder conveyer therefor, a platform including a platform conveyer, means attached to the platform for picking up a windrow and loading it onto the platform conveyer, means for driving the conveyers, independent means for driving the pick-up attachment, and a combined beater and volume governor for regulating the operation of the conveyers to control the feed of material to the thrashing cylinder.

12. In a harvester thrasher, a thrashing cylinder, a feeder conveyer therefor, a platform including a platform conveyer, means attached to the platform for picking up a windrow and loading it onto the platform conveyer, a drive shaft for the conveyers, a clutch for the drive shaft, a beater cooperating with the feeder conveyer, and means controlled by the beater for controlling the operation of the conveyers through the clutch to govern the volume of material fed to the thrashing cylinder.

13. In a harvester thrasher, a thrashing cylinder, a feeder conveyer therefor, a platform including a platform conveyer, means attached to the platform for picking up a windrow and loading it onto the platform conveyer, a drive shaft for the conveyers, a clutch for the drive shaft, a floating spiked beater in advance of the thrashing cylinder cooperating with the feeder conveyer, and means controlled by said beater for stopping and starting the conveyers through the clutch to govern the volume of material fed to the thrashing cylinder.

14. In a harvester thrasher, a thrashing cylinder, a feeder conveyer therefor, a platform including a platform conveyer, a drive shaft for operating the conveyers, a clutch for said drive shaft, a beater mounted for up and down movement in advance of the thrashing cylinder, and means movable with the beater for controlling the clutch to stop and start said conveyers for regulating the feed of material to the thrashing cylinder.

15. In a harvester thrasher, a thrashing cylinder, a feeder conveyer therefor, a platform including a platform conveyer, a drive shaft for operating the conveyers, a clutch for said drive shaft, a beater, means governed by the beater and the volume of material fed to the thrashing cylinder for controlling the clutch to stop and start the said shaft and with it the conveyers for regulating the feed of material to the thrashing cylinder, and means for driving said beater continuously.

16. In a harvester thrasher, a thrashing cylinder, a feeder conveyer therefor, a platform including a platform conveyer, a pick-up attachment for the platform to load a windrow onto the platform conveyer, a drive shaft for the conveyers, a clutch for said shaft, a beater cooperating with the feeder conveyer, means controlled by the beater for stopping and starting the conveyers through the clutch to regulate the feed of material to the thrashing cylinder, means for operating the pick-up attachment independently of the conveyers, and means for operating the beater continuously.

17. In a traveling combined harvester thrasher, a thrasher part including a thrashing cylinder, a feeding means therefor, a harvester part including a platform offset from the thrasher part, a conveyer on the platform for feeding grain to the feeding means, means associated with the platform for gathering the grain, and means controlled by the volume of grain fed to the cylinder for regulating the operation of the feeding means and platform conveyer as the machine is in travel.

18. In a traveling combined harvester thrasher, a thrasher part including a thrashing cylinder, feeding means therefor, a harvester part including a platform offset from the thrasher part, a conveyer on the platform for feeding grain to the feeding means, an engine for driving the cylinder, feeding means and said conveyer, a windrow pick-up device associated with the platform, a ground wheel drive for the pick-up device, and means controlled by the volume of grain fed to the cylinder for intermittently stopping the feeding means and conveyer as the machine travels through the field, said pick-up device continuing in operation with the stopped platform conveyer receiving and storing the grain.

In testimony whereof I affix my signature.

ALEXUS C. LINDGREN.